United States Patent [19]
Crump et al.

[11] Patent Number: 5,850,562
[45] Date of Patent: Dec. 15, 1998

[54] PERSONAL COMPUTER APPARATUS AND METHOD FOR MONITORING MEMORY LOCATIONS STATES FOR FACILITATING DEBUGGING OF POST AND BIOS CODE

[75] Inventors: Dwayne Thomas Crump; Steven Taylor Pancoast, both of Lexington, Ky.

[73] Assignee: International Business Machines Corporation, Armonk, N.Y.

[21] Appl. No.: 266,927

[22] Filed: Jun. 27, 1994

[51] Int. Cl.⁶ ............................... G06F 1/24; G06F 9/24; G06F 11/28; G06F 11/34
[52] U.S. Cl. .................... 395/800; 364/221.7; 364/267; 364/267.4; 364/267.91; 364/297.8; 364/269.4; 364/DIG. 1; 364/DIG. 2; 395/700; 395/183.16; 395/183.07
[58] Field of Search ................... 395/800, 575, 395/700, 725, 775, 275, 375, 750, 183.14, 183.07, 416, 497, 483, 739; 364/DIG. 1, DIG. 2; 371/16.1, 16.5, 19, 18, 72, 66

[56] References Cited

U.S. PATENT DOCUMENTS

| | | | |
|---|---|---|---|
| 4,701,845 | 10/1987 | Anderson et al. | 395/575 |
| 4,879,646 | 11/1989 | Iwasaki et al. | 395/375 |
| 5,047,926 | 9/1991 | Kuo et al. | 395/575 |
| 5,093,914 | 3/1992 | Coplien et al. | 395/700 |

OTHER PUBLICATIONS

Motorola Microcomputer Development Systems—Low Cost MPU/MCU Evaluation Modules, Motorola Microprocessors, Series C, Motorola Inc., 1983, pp. 8–10.

*Primary Examiner*—Daniel H. Pan
*Attorney, Agent, or Firm*—Daniel E. McConnell; Sean T. Moorhead

[57] ABSTRACT

A monitor and debugger routine operable on a personal computer for facilitating the design of power-on self-test (POST) and basic input and output system (BIOS) code. The monitor and debugger routine is invoked by POST code early in the system initialization process, before most of the system hardware devices have been initialized and before the operating system has been invoked. The monitor and debugger routine uses minimal system resources—lower memory and a serial communications controller—and is accessed via an external communications and display device connected via a serial communications link generated by the serial communications controller. As so invoked, the monitor and debugger routine can be used to facilitate the design and debugging of the remaining portions of the system initialization code, hardware interface code, suspend and resume code, video code, and other code that cannot be debugged using standard debuggers that require a functioning BIOS and an operating system to operate.

10 Claims, 6 Drawing Sheets

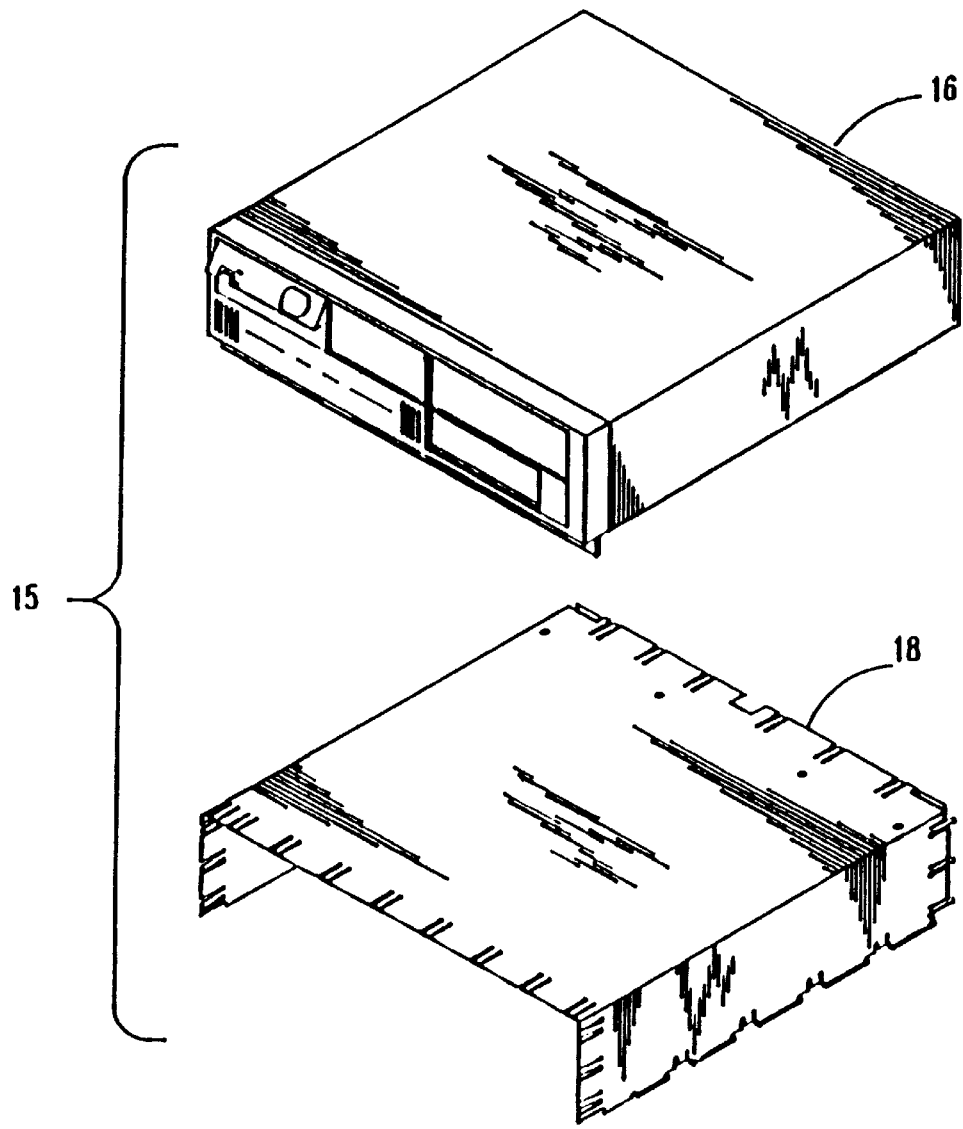
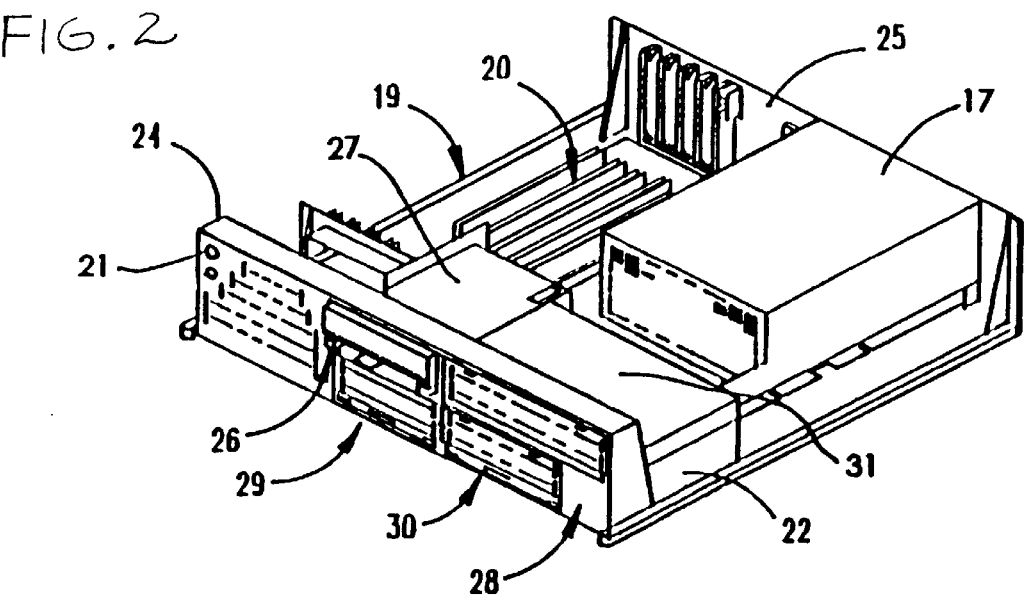
FIG. 2

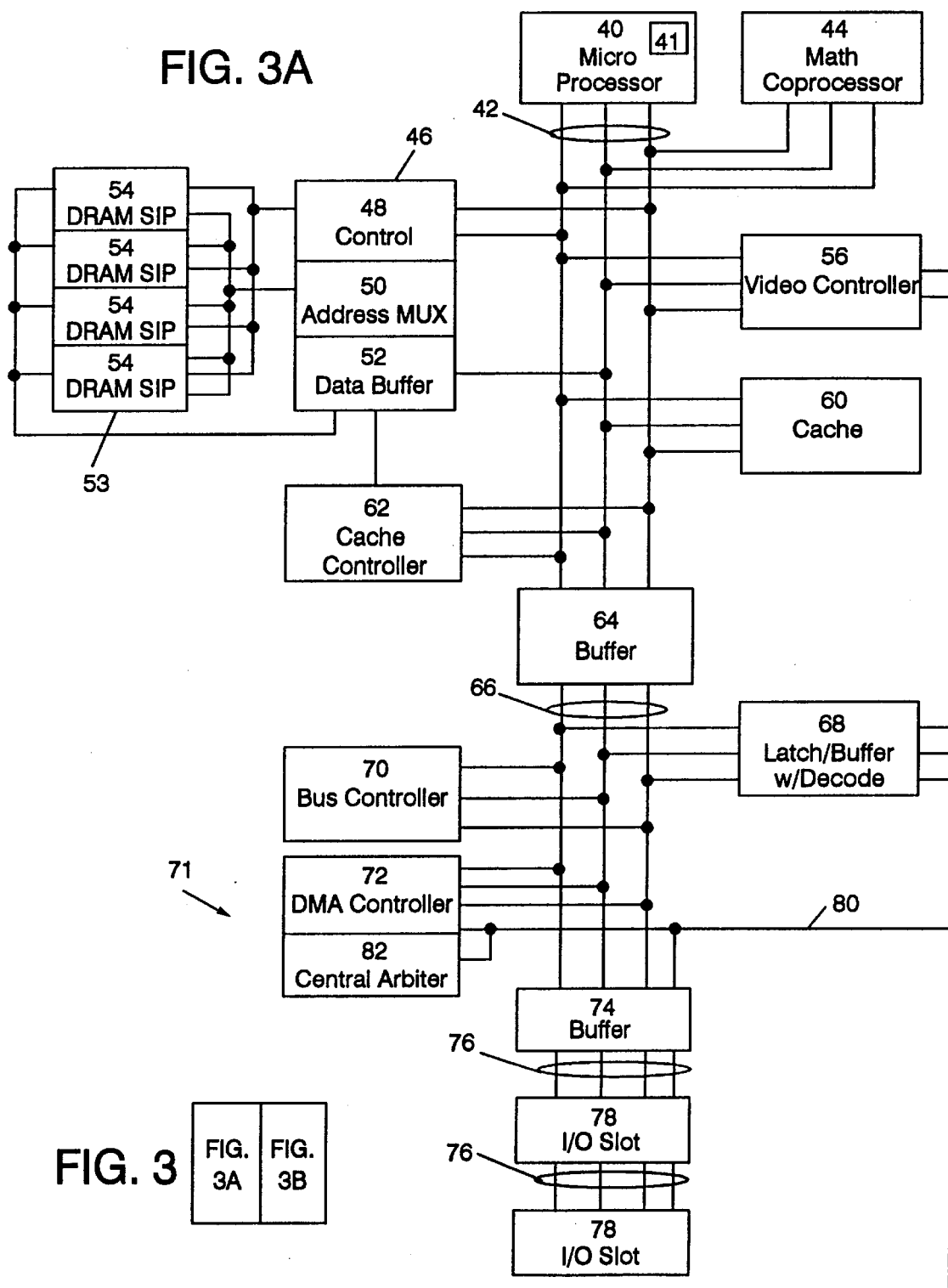

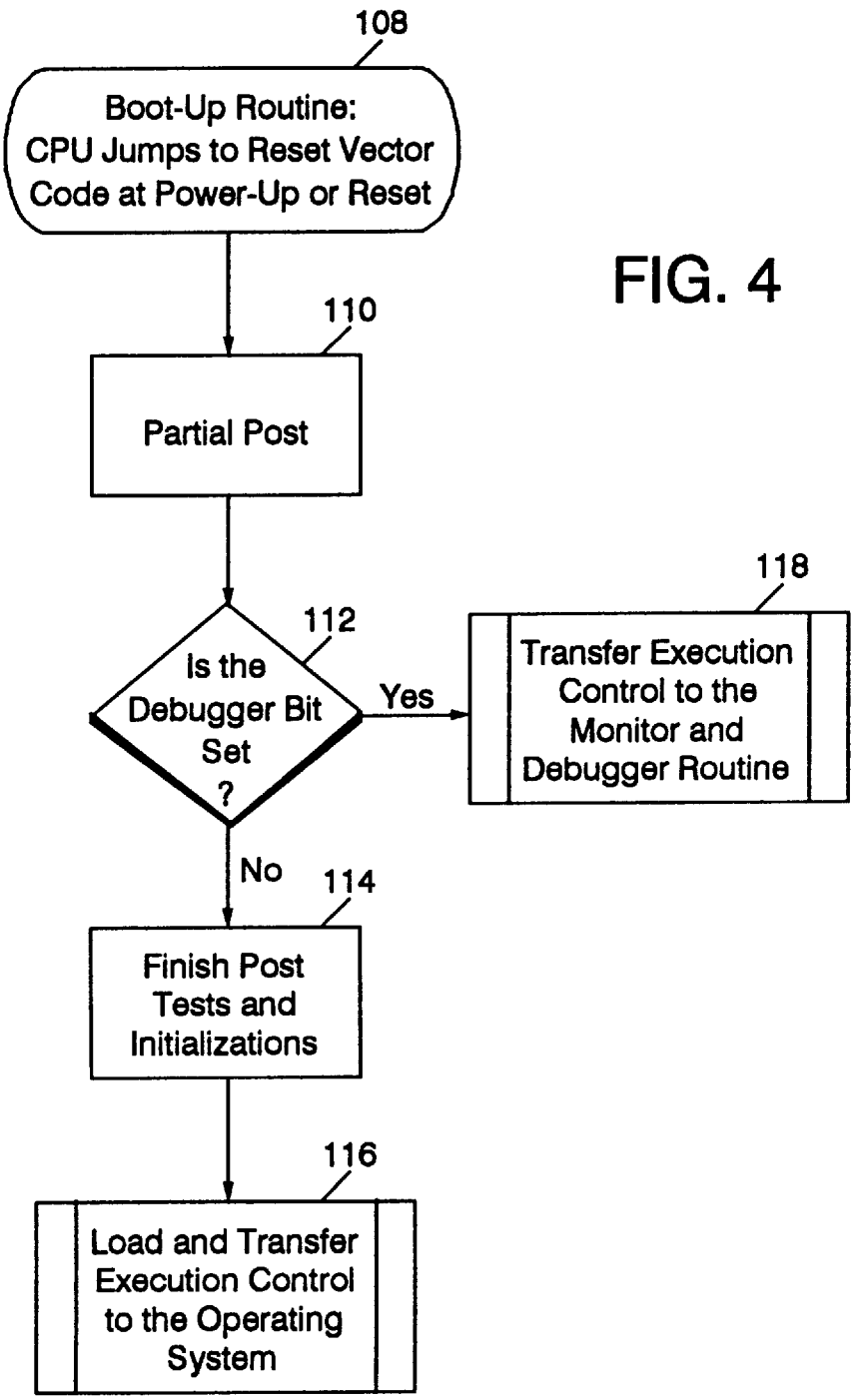

PERSONAL COMPUTER APPARATUS AND METHOD FOR MONITORING MEMORY LOCATIONS STATES FOR FACILITATING DEBUGGING OF POST AND BIOS CODE

FIELD OF THE INVENTION

The present invention relates generally to computer system design and, more specifically, to a computer system having a monitor and debugger module capable of starting execution before an operating system is loaded, thereby facilitating in situ design, testing, and revision of power-on self-test (POST) and basic input and output system (BIOS) code.

BACKGROUND OF THE INVENTION

Personal computer systems are well known in the art. Personal computer systems in general, and IBM Personal Computers in particular, have attained wide-spread use for providing computer power to many segments of today's modern society. Personal computers can typically be defined as a desktop, floor standing, or portable microcomputer that is comprised of a system unit having a single central processing unit (CPU) and associated volatile and nonvolatile memory, including all RAM and BIOS ROM, a video display controller, a video display terminal (also known as a "system monitor"), a keyboard, one or more flexible diskette drives, a fixed disk storage drive (also known as a "hard drive"), a so-called "mouse" pointing device, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT (IBM PC/AT), IBM's PERSONAL SYSTEM/1 (IBM PS/1), and IBM's PERSONAL SYSTEM/2 (IBM PS/2).

Personal computer systems are typically used to run software to perform such diverse activities as word processing, manipulation of data via spread-sheets, collection and relation of data in databases, displays of graphics, design of electrical or mechanical systems using system-design software, etc.

When computers are turned on, they typically go through a "booting" process. When a computer "boots" it first performs a power-on self-test (POST), which involves running various tests to ensure that the computer is functioning correctly and involves initializing the registers within certain hardware devices. Part of performing the POST involves loading the basic input and output system (BIOS) code into memory. After performing the POST, the computer typically loads an operating system (OS), such as IBM's PC-DOS or OS/2 or Microsoft's MS-DOS.

The POST and BIOS code are both intimately linked to the specific hardware of the computer system. The POST code typically tests and initializes specific hardware devices, such as the memory controller, the video controller, the serial communications controller, the parallel communications controller, the interrupt controller, the keyboard controller, the flexible diskette controller, and the fixed diskette controller. Likewise, the BIOS code interfaces between the specific hardware devices and programs, such as the operating system and application programs.

Because the POST code and BIOS code are so intimately connected to the hardware, developing POST code and BIOS code can be very difficult. Many tools are available to help design application programs. For example, the well known program DEBUG.COM, which is part of the PC-DOS suite of programs, allows developers to debug programs relatively easily. Many other similar programs for debugging code are known in the art. However, these programs typically are application programs themselves. That is, DEBUG.COM is an application that executes in a layer above PC-DOS, which executes in a layer above the BIOS.

It is readily apparent that these tools are virtually worthless for developing POST code and BIOS code. The computer system will not function before the POST code finishes executing and before a functioning BIOS is loaded into memory. As such, operating systems such as PC-DOS, OS/2, and MS-DOS, which require the completion of the POST and the presence of a functioning BIOS, cannot be loaded or executed. Without PC-DOS or another operating system loaded, the debugger tools, such as DEBUG.COM and others cannot be loaded or used. Thus, these operating system-based tools can be used to aid development of POST code or BIOS code.

Typically, the developer of POST code and BIOS code uses an in-circuit emulator (ICE) as a tool of choice to aid code development. ICE systems emulate the system processor and allow typical debugging tasks to be performed such as (1) viewing and modifying memory locations, I/O locations, and processor registers, (2) setting and clearing breakpoints, and (3) starting and stopping processor execution. However, ICE systems are very expensive, costing on the order of $30,000 to $50,000 for a system. Development sites often ration the use of limited ICE debugging tools, forcing developers to use less efficient tools, thereby impacting productivity.

Additionally, many new processors are incorporating a system management mode (SMM). SMM provides a state that can be entered via the highest level interrupt and is typically used for implementing power management functions and suspend/resume functions. Like POST code, the SMM code is located in firmware and contains hardware-specific functions and does not rely on any particular operating system.

Moreover, ICE systems must be restarted when the electrical power powering the electronic system being debugged is cycled. As such, using ICE systems to help with the design and debugging of suspend and resume systems that involve removing electrical power from one or more electronic devices in the computer system has a usability penalty in the form of restarting the ICE system.

Therefore, it is desirable to provide a way of debugging software without requiring that the BIOS be functioning or that an operating system be executed. It is also desirable to provide a way to aid the development and debugging of POST code, BIOS code, and SMM code.

SUMMARY OF THE INVENTION

According to the present invention, a computer system is provided having a low-level monitor and debugger routine. Preferably, the routine is capable of executing before the power-on self-test (POST) routine completes execution and before the basic input and output system (BIOS) code is made available to the system. Therefore, the monitor and debug routine is capable of facilitating the design and debugging of POST code and BIOS code.

In one embodiment, the execution of the monitor and debugger routine is controlled by a flag set in nonvolatile CMOS memory. In this embodiment, the POST routine begins by performing a minimal system initialization including enabling a lower portion of memory, performing a short memory test, decompressing the BIOS from the PROM and writing the BIOS sections to shadow memory, and initializing the serial communications controller. Then, the POST routine tests the flag in CMOS nonvolatile memory. If the flag is SET, then the POST routine passes execution control to the monitor and debugger routine. If the flag is not SET, then the POST routine continues executing, thereby initializing the system hardware. Thus, the debugger is always present and can be invoked by changing the flag in nonvolatile RAM and rebooting the system.

It is therefore an advantage of the present invention to provide a low-level monitor and debugger capable of execution before completion of the POST code execution.

It is a further advantage of this invention to provide a tool to facilitate the design and debugging of POST code and BIOS code, thereby increasing the productivity of programmers writing POST code and BIOS code.

It is yet another advantage of the present invention to provide a low-level debugger that can be easily invoked without requiring that a substantial portion of the system be functional, such as the keyboard, video subsystem, and a disk drive.

These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to example the principles of this invention.

FIG. 2 is an exploded perspective view of certain elements of the personal computer of FIG. 1 including a chassis, a cover, an electromechanical direct access storage device and a planar board and illustrating certain relationships among those elements;

FIG. 4 is a flow chart showing an overview of the low-level monitor and debugger routine of the present invention.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
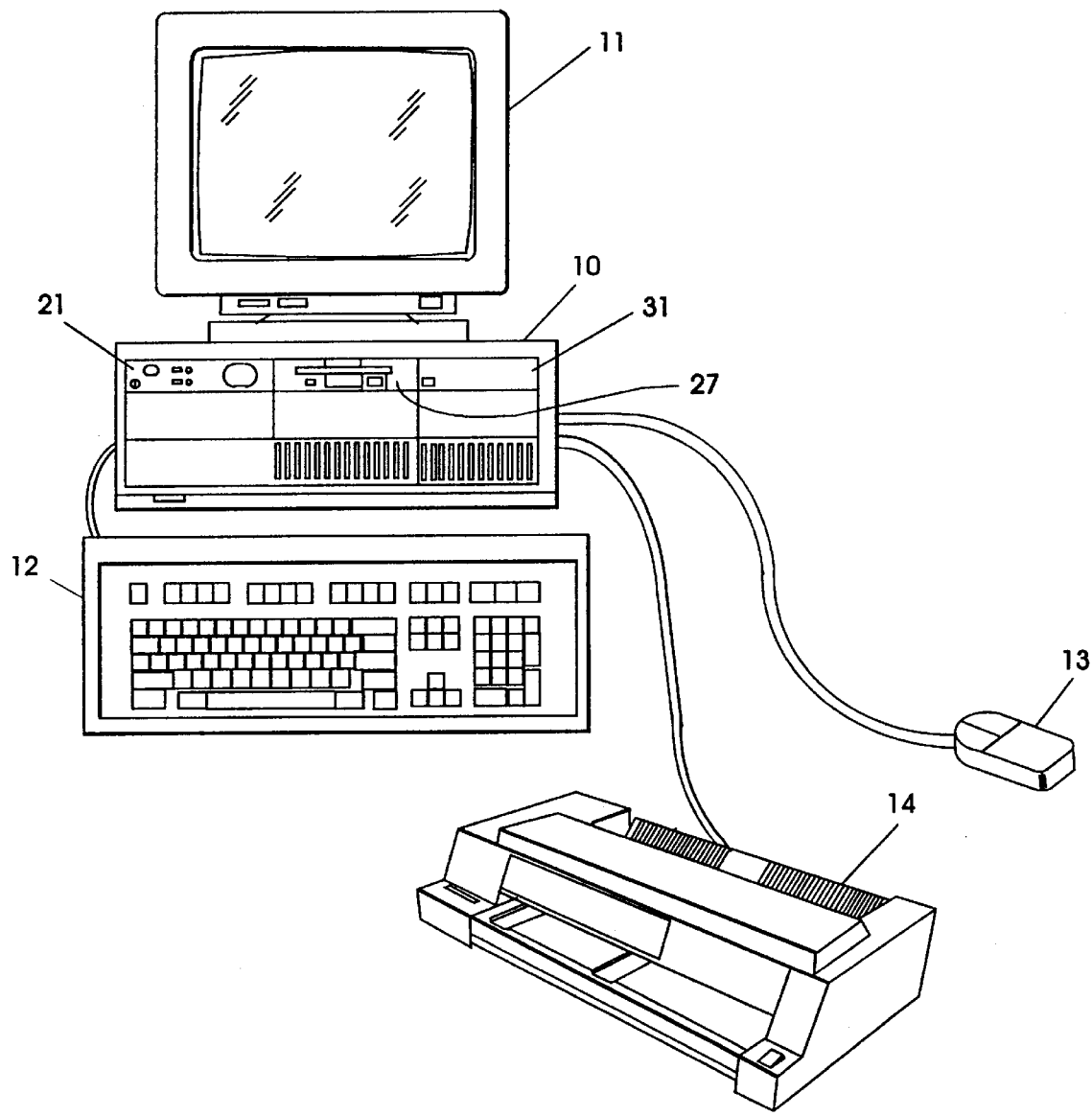
FIG. 1 is a perspective view of a personal computer embodying this invention.

Referring now more particularly to the accompanying drawings, a microcomputer system embodying the present invention is there shown and generally indicated at 10 (FIG. 1). As mentioned hereinabove, the computer 10 may have an associated monitor 11, keyboard 12, mouse 13, and printer or plotter 14. The computer 10 has a cover 15 formed by a decorative outer member 16 (FIG. 2) and an inner shield member 18 which cooperate with a chassis 19 in defining an enclosed, shielded volume for receiving electrically powered data processing and storage components for processing and storing digital data. At least certain of these components are mounted on a multilayer planar 20 or motherboard which is mounted on the chassis 19 and provides a means for electrically interconnecting the components of the computer 10 including those identified above and such other associated elements as floppy disk drives, various forms of direct access storage devices, accessory cards or boards, and the like. As pointed out more fully hereinafter, provisions are made in the planar 20 for the passage of input/output signals to and from the operating components of the microcomputer.

The computer system has a power supply 17 and a power switch 21, which switches unregulated line power to and from the power supply 17. The chassis 19 has a base indicated at 22, a front panel indicated at 24, and a rear panel indicated at 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a pair of lower bays 29, 30 are provided. One of the upper bays 26 is adapted to receive peripheral drives of a first size (such as those known as 3.5 inch drives) while the other 28 is adapted to receive drives of a selected one of two sizes (such as 3.5 and 5.25 inch) and the lower bays are adapted to receive devices of only one size (3.5 inch). One floppy disk drive is indicated at 27 in FIG. 1, and is a removable medium direct access storage device capable of receiving a diskette inserted thereinto and using the diskette to receive, store and deliver data as is generally known. One hard disk drive is indicated at 31 and is a fixed medium direct access storage device capable of storing and delivering data as is generally known.

Figure 3B:
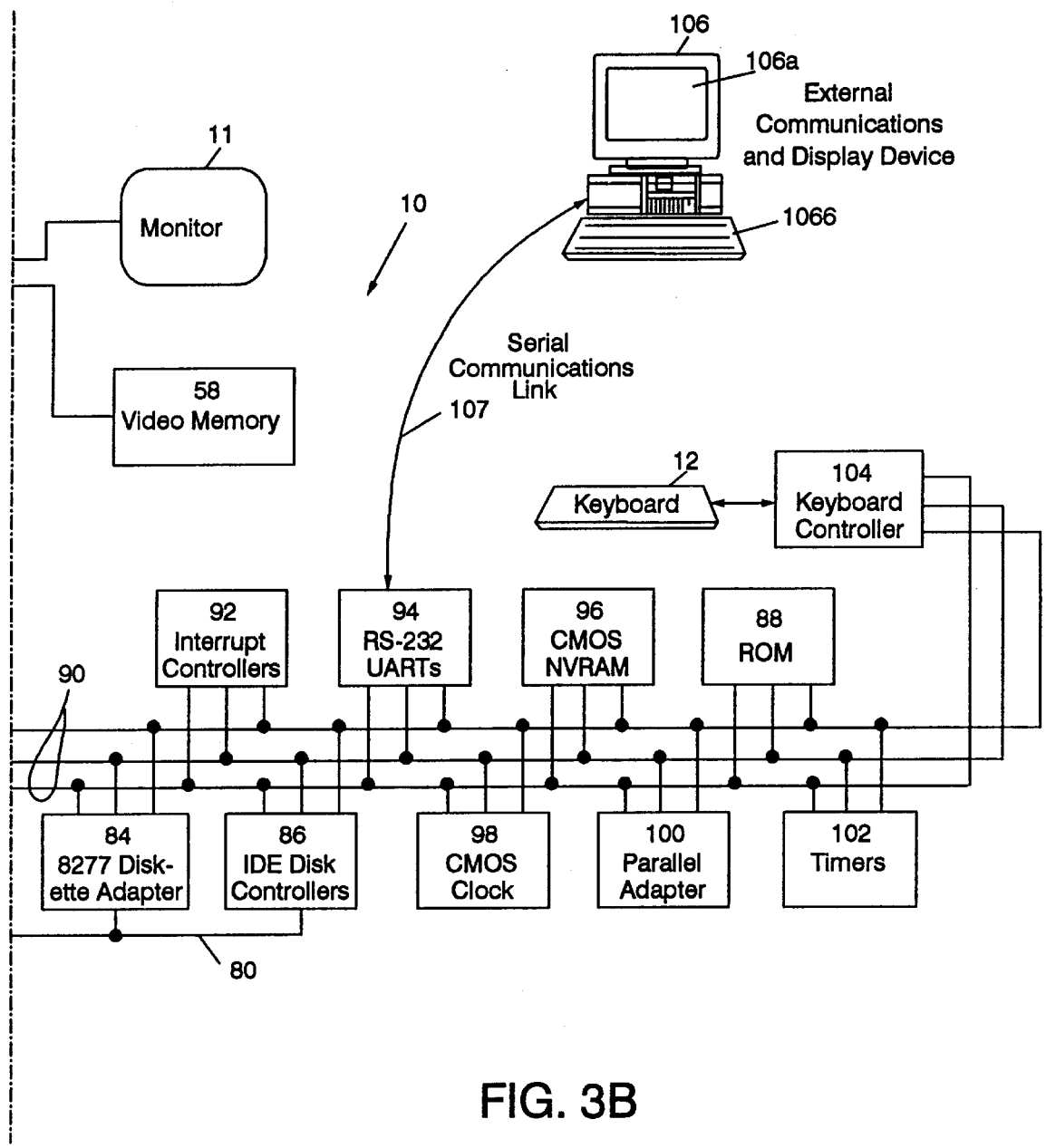
FIG. 3 (including FIGS. 3A and 3B) are electrical schematic block diagrams of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 40, also herein CPU 40, comprised of a microprocessor, which is connected by a high speed CPU local bus 42 through a memory control unit 46, which is further connected to a volatile random access memory (RAM) 53. The memory control unit 46 is comprised of a memory controller 48, an address multiplexer 50, and a data buffer 52. The memory control unit 46 is further connected to a random access memory 53 as represented by the four RAM modules 54. The RAM 54 preferably comprises at least one single in-line memory modules (SIMMs), which are known to those skilled in the art. The memory controller 48 includes the logic for mapping addresses to and from the microprocessor 40 to particular areas of RAM 53. This logic is used to reclaim RAM previously occupied by BIOS. Further generated by memory controller 48 is a ROM select signal (ROMSEL), that is used to enable or disable ROM 88. While any appropriate microprocessor can be used for system processor 40, one suitable microprocessor is the 80486 which is sold by INTEL. The Intel 80486 has an internal cache, therefore, any CPU 40 that is an Intel 80486 will have a CPU cache 41.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor 40 could be an Intel 80286 or 80386 microprocessor. As used herein, reference to an 80286 or 80386 or 80486 generally intends such a microprocessor as obtained from Intel. However, in recent times other manufacturers have developed microprocessors which are capable of executing the instruction set of the Intel X86 architecture, and usage of the terms stated is intended to encompass any microprocessor capable of executing that instruction set. As known to persons skilled in the applicable arts, early personal computers typically used the-then popular Intel 8088 or 8086 microprocessor as the system processor. These processors have the ability to address one megabyte of memory. More recently, personal computers typically use the high speed Intel 80286, 80386, and 80486 microprocessors which can operate in a virtual or real mode to emulate the slower speed 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors. Processors in the Intel family described are frequently identified by a three digit reference to only the last three digits of the full type designator, as "486".

Returning now to FIG. 3, the CPU local bus 42 (comprising data, address and control components) provides for the connection of the microprocessor 40, a math coprocessor 44, a video controller 56, a system cache memory 60, and a cache controller 62. The video controller 56 has associated with it a monitor (or video display terminal) 11 and a video memory 58. Also coupled on the CPU local bus 42 is a buffer 64. The buffer 64 is itself connected to a slower speed (compared to the CPU local bus 42) system bus 66, also comprising address, data and control components. The system bus 66 extends between the buffer 64 and a further buffer 68. The system bus 66 is further connected to a bus control and timing unit 70 and a DMA unit 71. The DMA unit 71 is comprised of a central arbiter 82 and a DMA controller 72. An additional buffer 74 provides an interface between the system bus 66 and an optional feature bus such as the Industry Standard Architecture (ISA) bus 76. Connected to the bus 76 are a plurality of I/O slots 78 for receiving ISA adapter cards (not shown). ISA adapter cards are pluggably connected to the I/O slots 78 and may provide additional I/O devices or memory for the system 10.

An arbitration control bus 80 couples the DMA controller 72 and central arbiter 82 to the I/O slots 78, a diskette controller 84, and an Integrated Drive Electronics (IDE) fixed disk controller 86.

While the microcomputer system 10 is shown with a basic 4 megabyte RAM module 53, it is understood that additional memory can be interconnected as represented in FIG. 3 by the addition of optional higher-density memory modules 54. For purposes of illustration only, the present invention is described with reference to the basic four megabyte memory module.

A latch buffer 68 is coupled between the system bus 66 and a planar I/O bus 90. The planar I/O bus 90 includes address, data, and control components respectively. Coupled along the planar I/O bus 90 are a variety of I/O controllers and other components such as the diskette controller 84, the IDE disk controller 86, an interrupt controller 92, an serial communications (RS-232) controller 94, nonvolatile CMOS RAM 96, also herein referred to as NVRAM, a CMOS real-time clock 98, a parallel communications (Centronics interface) controller 100, a plurality of timers 102, the preprogrammed read only memory (PROM) 88, and the 8042 keyboard and mouse controller 104. The 8042, shown at 104, is the slave microprocessor that interfaces with the keyboard 12 and the mouse 13. The programmable read only memory 88 includes the BIOS that is used to interface between the I/O devices and the operating system of the microprocessor 40. BIOS stored in ROM 88 can be copied into RAM 53 to decrease the execution time of BIOS. ROM 88 is further responsive (via ROMSEL signal) to memory controller 48. If ROM 88 is enabled by memory controller 48, BIOS is executed out of ROM. If ROM 88 is disabled by memory controller 48, ROM is not responsive to address inquiries from the microprocessor 40 (i.e. BIOS is executed out of RAM). Preferably the ROM 88 is a Flash PROM, which is known to those skilled in the art and which is manufactured by many sources and widely available. Also, preferably the system includes circuitry and firmware (not shown) configured to erase and program the Flash PROM in situ.

The real-time clock 98 is used for time of day calculations and the NVRAM 96 is used to store system configuration data. That is, the NVRAM 96 will contain values which describe the present configuration of the system. For example, NVRAM 96 contains information describing the capacity of a fixed disk or diskette, the type of display, the amount of memory, time, date, etc. Of particular importance NVRAM will contain data (can be one bit) which is used by memory controller 48 to determine whether BIOS is executed out of ROM or RAM and whether to reclaim RAM intended to be used by BIOS RAM. Furthermore, these data are stored in NVRAM whenever a special configuration program, such as SET Configuration, is executed. The purpose of the SET Configuration program is to store values characterizing the configuration of the system to NVRAM.

Nearly all of the above devices comprise volatile registers. To prevent the unnecessary cluttering of the drawings, the registers of a particular device will be referenced to that device. For example, the CPU registers will be referred to as the CPU 40 registers and the video controller registers will be referenced as the video controller 56 registers.

As mentioned hereinabove, the computer has a cover indicated generally at 15 which cooperates with the chassis 19 in forming an enclosed, shielded volume for containing the above identified components of the microcomputer. The cover 15 preferably is formed with an outer decorative cover member 16 which is a unitary molded component made of a moldable synthetic material and a metallic thin sheet liner 18 formed to conform to the configuration of the decorative cover member. However, the cover can be made in other known ways and the utility of this invention is not limited to enclosures of the type described.

Also shown in FIG. 3 is an external communications and display device 106. The external communications device 106 is connected to the computer system 10 via a serial communications link 107, which is generated by the serial communications controller 94. The external communications and display device is capable of transmitting and receiving data via the serial communications link 107. In addition, the device 106 has the capability of displaying data received via the link 107 on a cathode ray tube 106a, liquid crystal display (LCD), or the like, and has the capability of receiving user input from an input device such as a keyboard 106b or keypad. Examples of suitable external communications and display devices include a dedicated terminal station and a personal computer, such as an IBM PS/1, executing a terminal program, such as Datastorm's Procomm Plus (under PC-DOS), Microsoft's TERMINAL.EXE (under Windows) and PM Terminal (under OS/2).

In the form illustrated, the communications link 107 is provided by an electrically conductive tether having at least one electrical conductor therein, such as an elongate cable or the like. Such tethers are known, for example, for connecting a modem device or the like to a telephone system. In whatever form provided, the communications link is to have the functionality of transmitting signals between the external communications device 106 and the RS232 serial port 94 of the host system as shown in FIG. 3.

The BIOS code is responsible for interfacing between the system hardware electrical devices and the operating system and application programs. Some of the functions implemented by the BIOS include (1) responding to the non-maskable interrupt, (2) performing a print screen, (3) interfacing to the system timer 102, keyboard 12, video controller 56, flexible diskette controller 84, fixed diskette controller 86, serial communications controller 94, parallel communications controller 100, the printer 14, and the real time clock 98, (4) determining the hardware and memory size and configuration, and (5) performing various system services, which are known to those skilled in the art.

Referring now to FIG. 4, an overview of the present invention is shown. The power-on self test (POST) routine starts at 108 when the CPU 40 begins executing the code pointed to by the reset vector after the system power is applied or the system is reset. Thereafter, a partial POST is performed, at 112. The nature of the partial POST will depend on the specific nature of the computer system and the nature of the external communications device 106. The partial POST must at a minimum initialize the system for the operation of the monitor and debugger routine, which would necessarily include initializing the communications controller to generate the communications link 107 between the computer system 10 and the external communications device 106.

Thereafter, at 112, the flow of execution of the code on the CPU 40 depends on the state of one or more flags, including a Debugger Flag. If the Debugger Flag is not SET, then the POST finishes testing and initializing the hardware components of the system, at 114. Next, the operating system is loaded and execution control passes to the operating system, at 116.

On the other hand, if the Debugger Flag is-SET, then the execution control is transferred to the monitor and debugger routine, at 118. The details of the monitor and debugger routine are discussed further below.

Figure 5:
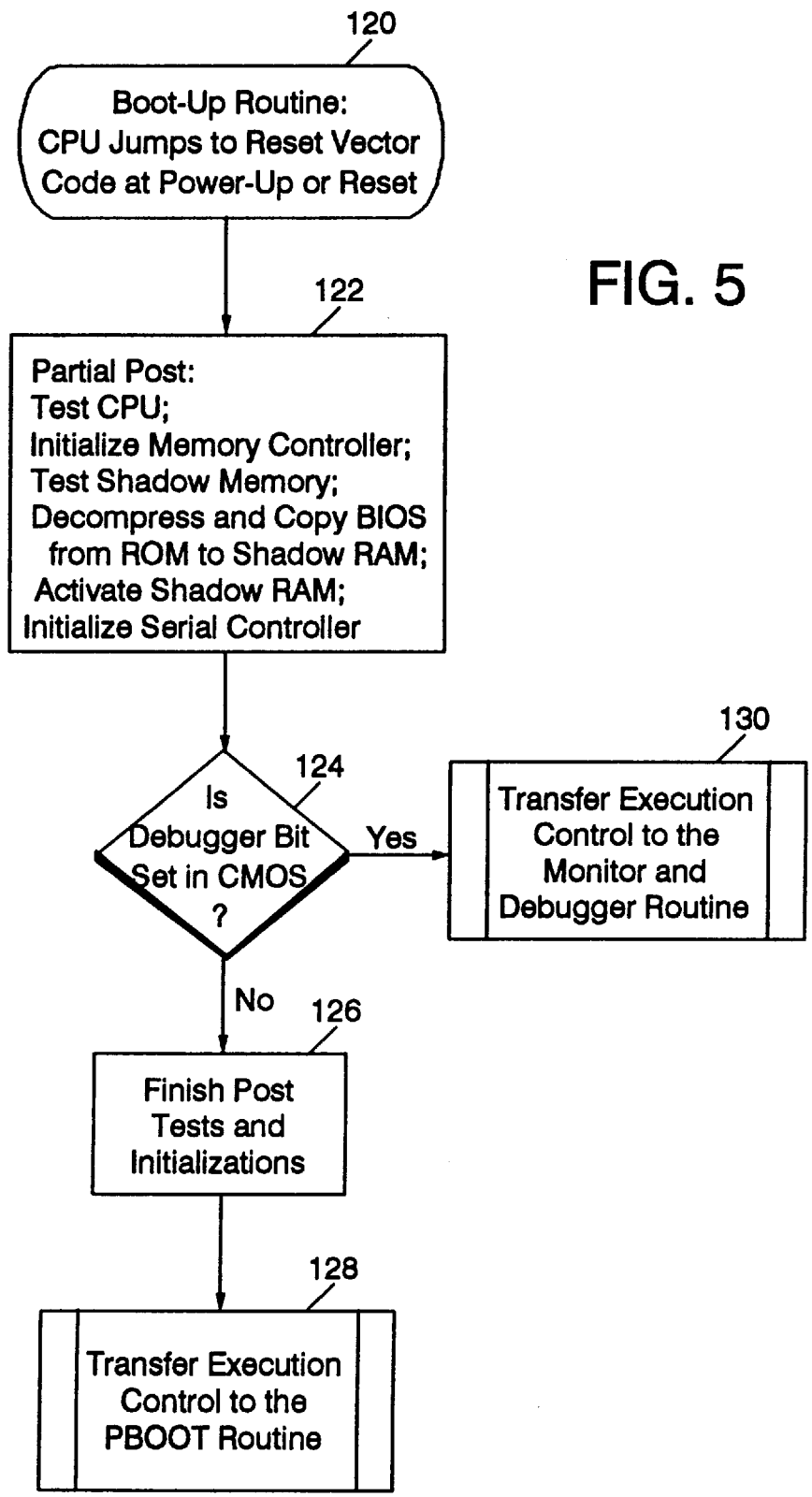
FIG. 5 is a flow chart showing some of the details of an embodiment of the present invention.

Referring now to FIG. 5, a more detailed flow chart showing an embodiment of the power-on self-test (POST) routine and monitor and debugger routine of the present invention is shown. The POST routine starts at 120 when the CPU 40 begins executing the code pointed to by the reset vector after the system power is applied or the system is reset. Such reset procedures are well known in the art.

The first task is to perform a partial POST, at 122. First, the POST routine tests the CPU 40 and initialize the memory controller 46. The POST routine tests the CPU by ensuring that the CPU passed its internal self-test and further by writing, shifting, and testing bits in the various registers. In initializing the memory controller 46, the POST routine enables accesses to the lower memory SIMM, which contains the lower 640 kilobytes of standard memory and the shadow RAM, as is known in the art.

Next, the shadow memory is tested and the BIOS is decompressed from the ROM 88 and copied to the shadow memory portion of RAM 53. The POST routine tests the system RAM 53 in segments E000H and F000H. These segments are given the standard, in-depth memory test comprising: (1) a sticky-bit test, (2) a double-bit memory test, and (3) a crossed address line test. These tests are well-known in the art.

The BIOS is stored in the ROM 88 in a series of serially stored compressed images. The monitor and debugger routine of the present invention is one such compressed image. The monitor and debugger is linked into the BIOS when the system software is compiled. The monitor and debugger routine can remain in the systems once development is complete. In the alternative, the monitor and debugger routine can be replaced with another module, such as a system logo display routine.

The images are decompressed and loaded into the appropriate portions of the shadow RAM. The monitor and debugger routine is loaded into the portion of memory at D800:0000. For debugging POST code, any portion of the lower one megabyte portion of memory would suffice. However, for debugging SMM code, the above address is preferable because when debugging SMM code, it is imperative that memory regions containing the operating system of application programs not be disturbed.

Shadowing the BIOS is done to increase the speed of the system; system performance is enhanced because the BIOS is running from the faster system RAM 53 (a typical access time is 80 nanoseconds) rather than the slower ROM 88 (typical access time 250 nanoseconds). Shadowing the BIOS comprises loading a BIOS decompresser and copier to an address in lower memory, decompressing the BIOS, copying the decompressed BIOS to appropriate portions of segments E000H and F000H of the system RAM 53, and enabling the shadow RAM. After the BIOS has been decompressed and loaded into the shadow RAM, the region of memory corresponding to the shadow RAM must be enabled in the memory controller 46.

Next one of the serial communications controllers 94 is initialized to provide a communications link 107 to the external communications device 106. Thus, at his point, the lower memory SIMM has been tested and enabled, the BIOS has been decompressed and placed in shadow RAM, and a serial communications controller has been initialized. None of the other controllers have been enabled and the other memory in the system is not available. At this stage of the POST, the keyboard cannot be used, the mouse cannot be used, the flexible diskette drive cannot be used, the fixed diskette cannot be used, the video system cannot be used. As such, none of the prior art debugging tools, such as DEBUG.COM, are usable on the system at this stage of the POST routine.

Next, the Debugger Flag is tested, at 124. The flow of execution of the code on the CPU 40 depends on whether the Debugger Flag is SET in the CMOS nonvolatile memory 96. Preferably, if the Debugger Flag, which is located at bit 0 of address 07FH of the CMOS memory 96, is not SET, then the POST routine continues, at 126.

Next the video controller 56 is tested and initialized and the video memory 58 is tested. These tests and initializations are well known in the arts The next task is to test the remaining system RAM 53 using the three-step, in-depth memory test described in the text above.

After all the memory is tested, the auxiliary devices— including the 8259 interrupt controller, the serial communications controllers (UARTs), the 8042 keyboard controller, and any others—are tested and initialized, as is known in the art. Next, the fixed disk controller is initialized and a complete test of the fixed disk controller 86 and hard drive 31 is performed, as is well known in the art.

Next, the floppy drive controller 84 is tested and initialized. Then, any BIOS extensions are "scanned in" and initialized at 416 as is well known in the art. BIOS extensions are blocks of BIOS code added to the system by peripheral controllers, such as network controllers. BIOS extensions are typically located in segments C000H and D000H on the ISA bus 76 and have an associated "signature" to identify the BIOS extension as such. If a BIOS extension is detected, the length is checked and a checksum is calculated and checked. If the signature, length, and checksum all indicate that a valid BIOS extension exists, program control passes to the instruction located three bytes past the signature and the BIOS extension can perform any needed tasks such as the initialization of the peripheral controller. Once the extension finishes execution, control passes back to the Boot-Up Routine, which searches for more BIOS extensions. Any more BIOS extensions are handled in the same manner as the BIOS extension above. If no more BIOS extensions are detected, the POST routine continues and passes execution control to the PBOOT routine, at 128.

The PBOOT routine is a well-known routine that runs on several IBM computers and certain other computers based on Intel microprocessors. PBOOT determines from where to boot the operating system (either from the hard drive 31 or from a disk inside the floppy drive 27), loads the operating system, analyzes and implements system changes as instructed by the CONFIG.SYS file, and finally executes the AUTOEXEC.BAT batch file before returning control to the operating system. The PBOOT routine is well known in the art.

Referring back to task 124, if the Debugger Flag is set in CMOS NVRAM 96, indicating that the monitor and debugger routine is to be executed, then the flow of the executed code then branches to the monitor and debugger routine, at 130.

When execution control is transferred to the monitor and debugger routine, many of the subsystems of the computer system are not yet functioning. Therefore, the monitor and debugger routine is configured to be accessed by a communications device 106 external to the computer system 10.

The monitor and debugger routine must first be initialized. The monitor and debugger routine hooks the debug and single step interrupt vectors in the system interrupt vector table for the CPU 40, as is known in the art. See, *i486 Microprocessor Programmer's Reference Manual,* Intel Corp., 1990, pages 11-1 to 11-9. With the CPU 40 being an 80486, hooking these vectors allows the monitor and debugger routine to use the 486 internal debug registers, to use normal "CC" break points in the code, to set breakpoints in the ROM code, and to set breakpoints on memory accesses. See id.

Once initialized, the monitor and debugger routine has two major operations: (1) providing a communications link 107 to the external communications device 106 and (2) displaying and modifying memory and registers and controlling operation of the code executing on the CPU 40. Specifically, the monitor and debugger routine interfaces with the external communications and display device 106 via the serial communications controller 94 and responds to the following commands from the external communications device 106 in the following formats:

---

Display Memory (displaying 8 lines of memory)
   D <ADDR>
Set Memory Breakpoints (Break on any R/W/X access)
   B <ADDR> (setting one breakpoint)
   B <ADDR> <ADDR> (setting two breakpoints)
Clear all memory breakpoints
   B
Go (Execute without setting breakpoints)
   G
Go After setting Breakpoints (break on execute
  access only)
   G <ADDR> (setting one breakpoint)
   G <ADDR> <ADDR> (setting two breakpoints)
Input from I/O Port (Read byte)
   I <PORT>
Modify Memory
   M <ADDR>=<Value(s)> (bytes, words, or double)
Output to I/O Port
   O <PORT>=<Byte Value>
Display all registers
   R
Modify a register (to a specified value)
   R <REG Name>=<Value>
Trace (execute next instruction & display
registers)
   T

---

In this particular embodiment, the address terms <ADDR> can be an offset, a segment:offset, a register name, or a numeric value. Any numeric value may be a register name as well, and the addition and subtraction of numeric values (including registers) is permitted.

Interfacing via a serial communications controller is known in the art. The monitor and debugger routine signals that it is active and awaiting commands by transmitting a message (e.g., "System turned on with Debugger Enabled. BIOS Debugger V1.3") and a cursor (e.g., a minus sign "−") to the serial communications controller 94 for transmission to the external communications device 106 via the serial communications link 107. The user, seeing the message and cursor displayed on the external communications device 106 is thus aware that the monitor and debugger module is loaded and functioning. Thereafter, the monitor and debugger routine acts responsive to commands from the user.

Preferably, the messages sent to the external communications device 106 are in ASCII code format, as is known in the art. In the alternative, other formats can be used, such as compressed formats or pure binary data formats.

Responsive to the Display Memory command, D <ADDR>, being transmitted to the monitor and debugger module from the external communications device 106 via the serial communications link 107, the monitor and debugger routine causes the external communications device to display the data located at the desired region of memory. Specifically, the monitor and debugger routine polls the serial communications controller 94 for input codes arriving via the serial communications link 107. Responsive to the Display Memory command being received via the serial communications link 107, the monitor and debugger routine (1) causes the CPU 40 to read the particular area of memory, (2) formats the memory data into a format suitable for display on the external communications device, and (3) transmits the formatted memory data and a new cursor to the serial communications controller 94 for transmission to the external communications device 106 via the serial communications link 107.

For example, assuming that the ES segment register contains the value 0000H and assuming that the EAX general register contains the value 21234H, responsive to the command D ES:EAX+100, the monitor and debugger routine would transmit with the serial controller 94 a signal corresponding to the following display:

```
0000:00021334 00 00 00 00 00 00 00 00 ............
0000:00021343 00 00 00 00 00 00 00 00 ............
. . . .
```

(a total of, e.g., eight lines) followed by another cursor.

Responsive to the Set Breakpoint command, B <ADDR> or B <ADDR> <ADDR>, being transmitted to the monitor and debugger module from the external communications device 106 via the serial communications link 107, the monitor and debugger routine sets either one or two breakpoints for the address(es). These breakpoints cause a break on a memory read, write, or execution access at that location. Specifically, the monitor and debugger routine polls the serial communications controller 94 for input codes arriving via the serial communications link 107. Responsive to the Set Breakpoint command being received via the serial communications link 107, the monitor and debugger routine causes the CPU 40 to write the desired breakpoint address (es) to one of the 486 debug address registers, thereby setting a breakpoint at the address(es), enabling the breakpoint by setting the applicable control bit(s) in the debug control registers of the 486 CPU 40. Finally, the monitor and debugger routine transmits a new cursor character to the serial communications controller 94 for transmission to the external communications device 106 via the serial communications link 107. After the breakpoints are set, once the code being debugged begins execution again, then any access to or from that memory location, whether a data access or an execution access) will cause a debug interrupt, which passes execution control back to the monitor and debugger routine.

Responsive to the Clear Breakpoint command, B, being transmitted to the monitor and debugger module from the external communications device 106 via the serial communications link 107, the monitor and debugger routine clears all breakpoints. Specifically, the monitor and debugger routine polls the serial communications controller 94 for input codes arriving via the serial communications link 107. Responsive to the Clear Breakpoint command being received via the serial communications link 107, the monitor and debugger routine causes the 486 CPU 40 to reset the applicable control bit(s) in the debug control registers of the CPU 40, thereby disabling all of the 486 debug address registers, effectively clearing the breakpoint(s) at those address(es). Finally, the monitor and debugger routine transmits a new cursor character to the serial communications controller 94 for transmission to the external communications device 106 via the serial communications link 107.

Responsive to the Go command, G, being transmitted to the monitor and debugger module from the external communications device 106 via the serial communications link 107, the monitor and debugger routine begins execution of the code on the CPU 40 at the next instruction. Specifically, the monitor and debugger routine polls the serial communications controller 94 for input codes arriving via the serial communications link 107. Responsive to the Go command being received via the serial communications link 107, the monitor and debugger routine causes the CPU 40 to begin execution of the code starting at the instruction in the code segment (CS) pointed to by the instruction pointer (EIP) before the debug exception occurred by executing an IRET instruction, thereby returning from the debug exception.

After a Go command is acted upon, the CPU 40 will execute the code indefinitely, until either an instruction-breakpoint fault occurs or a data-breakpoint trap occurs. As stated above, if either breakpoint is triggered, then execution control is transferred back to the monitor and debugger routine, which transmits a new cursor character to the serial communications controller 94 for transmission to the external communications device 106 via the serial communications link 107.

The monitor and debugger routine also responds to a Go After Setting Breakpoints command, G <ADDR> or G <ADDR> <ADDR>. Responsive to the Go After Setting Breakpoints being transmitted to the monitor and debugger module from the external communications device 106 via the serial communications link 107, the monitor and debugger routine sets one or two instruction-breakpoints and begins execution of the code on the CPU 40 at the next instruction. Specifically, the monitor and debugger routine polls the serial communications controller 94 for input codes arriving via the serial communications link 107. Responsive to the Go After Setting Breakpoints command being received via the serial communications link 107, the monitor and debugger routine causes the CPU 40 to (1) write the desired breakpoint address(es) to one of the 486 debug address registers, thereby setting a breakpoint at the address (es), which generate an instruction-breakpoint fault before the instruction located at that address and (2) begin execution of the code starting at the instruction in the code segment (CS) pointed to by the instruction pointer (EIP) before the debug exception occurred by executing an IRET instruction, thereby returning from the debug exception.

As with the Go command, after a Go After Setting Breakpoints command is acted upon, the CPU 40 will execute the code indefinitely, until either an instruction-breakpoint fault occurs or a data-breakpoint trap occurs. As stated above, if either breakpoint is triggered, then execution control is transferred back to the monitor and debugger routine, which transmits a new cursor character to the serial communications controller 94 for transmission to the external communications device 106 via the serial communications link 107.

Responsive to the Input from I/O Port command, I <port>, being transmitted to the monitor and debugger module from the external communications device 106 via the serial communications link 107, the monitor and debugger routine causes the external communications device to display the data byte located at the desired I/O port. Specifically, the monitor and debugger routine polls the serial communications controller 94 for input codes arriving via the serial communications link 107. The i86 family of processors do not have memory-mapped I/O; rather, the I/O space lies parallel to the address space using the lower 64 kilobytes of the address lines. Thus, I/O ports must be accessed differently than memory. Responsive to the Input from I/O Port command being received via the serial communications link 107, the monitor and debugger routine (1) causes the CPU 40 to read the data byte at that particular I/O port, (2) formats the I/O port data into a format suitable for display on the external communications device, and (3) transmits the formatted I/O port data and a new cursor to the serial communications controller 94 for transmission to the external communications device 106 via the serial communications link 107.

Responsive to the Modify Memory command, <ADDR>=<Value(s)>, being transmitted to the monitor and debugger module from the external communications device 106 via the serial communications link 107, the monitor and debugger routine causes the CPU 40 to modify the data located at the desired region of memory. Specifically, the monitor and debugger routine polls the serial communications controller 94 for input codes arriving via the serial communications link 107. Responsive to the Modify Memory command being received via the serial communications link 107, the monitor and debugger routine causes the CPU 40 to (1) format the memory data into a format suitable to be written to memory, (2) writes the formatted data to the particular area of memory, and (3) transmits a new cursor to the serial communications controller 94 for transmission to the external communications device 106 via the serial communications link 107.

Responsive to the Output to I/O Port command, O <port>=<byte value>, being transmitted to the monitor and debugger module from the external communications device 106 via the serial communications link 107, the monitor and debugger routine causes the external communications device to write the byte value to the desired I/O port. Specifically, the monitor and debugger routine polls the serial communications controller 94 for input codes arriving via the serial communications link 107. The i86 family of processors do not have memory-mapped I/O; rather, the I/O space lies parallel to the address space using the lower 64 kilobytes of the address lines. Thus, I/O ports must be accessed differently than memory. Responsive to the Input from I/O Port command being received via the serial communications link 107, the monitor and debugger routine causes the CPU 40 to (1) format the byte value into a format suitable for writing to the I/O port, (2) write the data byte to that particular I/O port, and (3) transmit a new cursor to the serial communications controller 94 for transmission to the external communications device 106 via the serial communications link 107.

Responsive to the Display All Registers command, R, being transmitted to the monitor and debugger module from the external communications device 106 via the serial communications link 107, the monitor and debugger routine causes the external communications device to display the data located in all the registers. Specifically, the monitor and debugger routine polls the serial communications controller 94 for input codes arriving via the serial communications link 107. Responsive to the Display All Registers command being received via the serial communications link 107, the monitor and debugger routine (1) causes the CPU 40 to read the value stored in each register of the CPU 40, (2) formats the register data into a format suitable for display on the external communications device, and (3) transmits the formatted register data and a new cursor to the serial communications controller 94 for transmission to the external communications device 106 via the serial communications link 107.

For example, assuming that the registers have the values as indicated below, the monitor and debugger routine would transmit with the serial controller 94 a signal corresponding to the following display:

```
EAX=00001234 EBX=00000000 ECX=00000000 EDX=00000000 ESI=00000000 EDI=00000000
EBP=00000000 SS=0000 ESP=00000000 SS:SP=0000 0000 0000 0000 0000o 0000 0000 0000
DS=1200 ES=2000 FS=0000 GS=0000 FL=00000000 - OVF INC EI-POS ZR - CY
CS=0800 EIP=00000453 CS:IP=00 00 00 00 00 00 00 00 00 00 00 00 00 00 00 00
``` followed by another cursor.

Responsive to the Modify Register command, R <register name>=<Value>, being transmitted to the monitor and debugger module from the external communications device 106 via the serial communications link 107, the monitor and debugger routine causes the CPU 40 to modify the data located at the desired region of memory. Specifically, the monitor and debugger routine polls the serial communications controller 94 for input codes arriving via the serial communications link 107. Responsive to the Modify Register command being received via the serial communications link 107, the monitor and debugger routine causes the CPU 40 to (1) format the value into a format suitable to be written to the specified register, (2) writes the formatted data to the particular register, and (3) transmits a new cursor to the serial communications controller 94 for transmission to the external communications device 106 via the serial communications link 107.

Responsive to the Trace command, T, being transmitted to the monitor and debugger module from the external communications device 106 via the serial communications link 107, the monitor and debugger routine causes the CPU 40 to execute a single instruction and causes the external communications device to display the data located in all the registers. Specifically, the monitor and debugger routine polls the serial communications controller 94 for input codes arriving via the serial communications link 107. Responsive to the Trace command being received via the serial communications link 107, the monitor and debugger routine causes the CPU 40 to set a trap flag in the flags register of the CPU 50 and begin execution of the code starting at the instruction in the code segment (CS) pointed to by the instruction pointer (EIP) before the debug exception occurred by executing an IRET instruction, thereby returning from the debug exception.

Because the trap flag in the flags register of the 486 CPU 50 is set, after a Trace command is acted upon, the CPU 40 will execute only the next code instruction. Then a debug exception occurs and execution control is transferred back to the monitor and debugger routine, which performs the tasks associated with the Display Registers command, above, and transmits a new cursor character to the serial communications controller 94 for transmission to the external communications device 106 via the serial communications link 107.

Using the monitor and debugger routine of the present invention is fairly straightforward. The user writes the code to be tested and debugged. The PROM is programmed. The monitor and debugger routine and any invoking routine(s) are included in the routines programmed into the PROM.

Preferably, the circuitry needed to program the PROM is present on the motherboard. The system is then powered-up. At this point, either (1) the monitor and debugger routine is invoked first and used to determine if the target code functions properly or (2) the target code is executed, the actual results of its execution are compared to the expected results of its execution, and if the actual results differ from the expected results, then the monitor and debugger routine is invoked to determine the cause of the difference. In either case, thereafter, the target code is modified and the cycle starts again.

The monitor and debugger routine of the present invention is particularly useful for debugging POST, BIOS, SMM, and OS code used on motherboards for complete systems. Such a motherboard might have, in addition to the CPU, PROM, RAM, memory controller, and communications controller, a video controller and a keyboard controller with an associated video display terminal and keyboard attached thereto. The user can (1) use the keyboard 12 and the display 11 of the target system to interact with and determine if the target system is functioning correctly by comparing the actual results of the executed target code to the expected results and, if the actual results differ from the expected results, (2) invoke the monitor and debugger routine and use the keyboard 106b and display 106a of the external communications and display device 106 to interact with the monitor and debugger routine, thereby debugging the target system. Again, because it uses so little of the system hardware, the monitor and debugger routine can be used to debug code without requiring or interfering with the operation of the POST, BIOS, SMM, and OS code.

To use the monitor and debugger routine, it must be loaded into memory and have control over the execution of the CPU code. As described in text accompanying FIGS. 4 and 5, the execution control can be passed to the monitor and debugger routine responsive to the Debugger Flag being SET. However, to use this embodiment, the Debugger Flag must be SET in the CMOS nonvolatile RAM, as explained above. It is possible to set this bit in several ways. For example, the POST routine can set the bit very soon after the code starts executing at the address indicated by the Reset Vector. Then, each time the system restarts, the debugger will be invoked. From there, the debugger can either be exited by simply issuing the Go command with no breakpoints set, or utilized to debug the system. Since, the POST code and BIOS code are located in the PROM 88, any modifications to that code can be accompanied by code setting that bit and placed in the new ROM.

As another example, a simple program can be written to set the bit in the CMOS nonvolatile memory. If the system is not too corrupt, the user can execute that program from the operating system, thereby setting the bit, and restart the system, thereby invoking the monitor and debugger program of the present invention.

In the alternative, methods other than setting and testing the Debugger Flag in CMOS nonvolatile memory can be used to activate the monitor and debugger routine. Specifically, a particular piece of code other than the POST can invoke the monitor and debugger routine. For example, the suspend/resume code can be modified to call the monitor and debugger routine before or after the system state is saved or before or after the system state is restored.

As another example, a routine in the POST can use the status of the communications link to determine whether or not to activate the monitor and debugger routine. Specifically, in the embodiments of FIGS. 4 and 5, instead of checking the status of the Debugger Flag at steps 112 and 124, after the serial communications controller 94 is initialized the POST can use the serial communications controller 94 to test the condition of the data set ready (DSR) and the clear to send (CTS) lines of the RS-232C serial communications link 107. If the status of the DSR and CTS lines indicate the presence of an external communications device 106 that is ready to communicate, then the routine can pass execution control to the monitor and debugger routine. Invoking the monitor and debugger routine in this example is particularly straightforward. If the monitor and debugger routine is not needed, then the external communications and display device 106 is disconnected from the serial communications controller 94 (by, e.g., either physically disconnecting the two by unplugging the serial link connector or logically disconnecting the two by removing either the DSR signal, the CTS signal, or both) before the system is restarted. As the system restarts, the absence of proper levels at either DSR, CTS, or both DSR and CTS is detected and the monitor and debugger routine is not invoked. On the other hand, if the monitor and debugger routine is needed, then the external communications and display device 106 is connected to the serial communications controller with DSR and CTS at proper levels and the system is restarted. As the system restarts, the serial communications controller 94 detects proper levels at both DSR and CTS and execution control is passed to the monitor and debugger routine.

It is readily apparent that the technique described in the paragraph immediately above would preferably not be used for systems in which the monitor and debugger routine remains in systems sold to the general public. Rather, that technique would most likely be used internally for designers and that routine would not be linked into the final commercial system. In the alternative, the Debugger Flag can be combined with the DTR and CTS status check such that if the Debugger Flag is set and the DTR and CTS lines indicate that an external communications device is connected and ready to communicate, then the monitor and debugger routine is invoked. Using this alternative, the routines could be linked into a system for use by the general public.

Once the monitor and debugger program is active, it can be used by the user to facilitate the debugging and design of the code. The actual sequence of commands will depend on the particular habits of the user; however, a typical session might include: (1) setting a data-breakpoint or two in the code being developed using the Set Memory Breakpoints command, (2) setting an instruction-breakpoint or two and starting execution of the code with the Go After Setting Breakpoints command, (3) waiting for a breakpoint, (4) examining relevant memory and registers using the Display Memory and Display All Registers commands (comparing the displayed results with the expected results), (5) stepping through the code using the Trace command (comparing the displayed results with the expected results), (6) making modifications to the code being developed responsive to the comparison of the displayed results to the expected results, and (7) restarting the system again, thereby beginning the cycle again.

While the present invention has been illustrated by the description of embodiments thereof, and while the embodiments have been described in considerable detail, it is not the intention of the applicant to restrict or in any way limit the scope of the appended claims to such detail. For example, although the embodiment described above is designed around a 486 microprocessor, the monitor and debugger routine can be used to facilitate the design, testing, and revision of many different types of motherboards, such as those based on CPUs manufactured by Motorola Inc., Advanced Micro Devices, etc. As another example, the terminal program executing on the external communications and display device can be modified to provide disassembly of instructions (by adding a routine to convert machine-readable instructions and operands into their associated ASCII mnemonics and ASCII operands) and to provide a symbolic debugging front end (by adding a routine to use the map file from the linker to translate symbols to absolute addresses, which are sent to the monitor and debugger routine via the serial link). Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

We claim:

1. A computer system comprising:
   (A) a central processing unit (CPU) having registers associated therewith and functioning for executing code including an operating system;
   (B) a programmable read-only memory (PROM) in circuit communication with said CPU and containing code (PROM code) executable on said CPU and which is other than operating system code;
   (C) a random access memory (RAM) in circuit communication with said CPU;
   (D) a memory controller in circuit communication with said CPU and configured to interface between said CPU and said RAM;
   (E) a video controller in circuit communication with said CPU and configured to generate signals corresponding to a visual image corresponding to data within a video memory;
   (F) a keyboard controller in circuit communication with said CPU and configured to interface between said CPU and a keyboard;
   (G) a communications controller in circuit communication with said CPU and configured to interface between said CPU and a communications bus;
   (H) a basic input and output module stored within said PROM and configured to interface between code executing on said CPU and said memory controller, said communications controller, said video controller, and said keyboard controller; and
   (I) a monitor and debugger module stored within said PROM, in circuit communication with an external communications device via a communications link, said monitor and debugger module being configured to:
   (1) execute on said CPU prior to the operating system being loaded into said RAM and before the execution of the operating system,
   (2) receive monitor commands from said external communications device,
   (3) receive debugger commands from said external communications device,
   (4) respond to a first monitor command being transmitted by the external communications device by transmitting to said external communications device a signal corresponding to the then current state of the registers of said CPU,
   (5) respond to a second monitor command being transmitted by the external communications device by modifying the state of the registers of said CPU,
   (6) respond to a third monitor command being transmitted by the external communications device by transmitting to the external communications device a signal corresponding to the then current state of at least one memory location,
   (7) respond to a fourth monitor command being transmitted by the external communications device by modifying the state of at least one memory location,
   (8) respond to a first debugger command being transmitted by the external communications device by setting at least one breakpoint corresponding to at least one particular location in said RAM,
   (9) respond to a second debugger command being transmitted by the external communications device by clearing at least one breakpoint corresponding to at least one particular location in said RAM,
   (10) respond to a third debugger command being transmitted by the external communications device by starting the execution of PROM code by said CPU at a particular code instruction,
   (11) respond to the executing PROM code accessing a portion of said RAM corresponding to a breakpoint by ceasing the execution of PROM code by said CPU,
   (12) respond to the executing PROM code executing from a portion of said RAM corresponding to a breakpoint by ceasing the execution of PROM code by said CPU, and
   (13) respond to a fourth debugger command being transmitted by the external communication device by causing said CPU to execute a single PROM code instruction and transmit to said external communications device a signal corresponding to the then current state of the registers of said CPU.

2. A computer system according to claim 1 further comprising:
   (a) an interrupt controller in circuit communication with said CPU and configured to interface interrupts to said CPU; and
   (b) a peripheral bus bridge in circuit communication with said CPU and configured to interface between said CPU and a peripheral bus; and
   (l) wherein said communications controller is a serial communications controller, said communications link is a serial communications link, and said monitor and debugger module is in circuit communication with said external communications device via said serial communications link; and
   (c) wherein said basic input and output module stored within said PROM is configured to interface between code executing on said CPU and said memory controller, said video controller, said communications controller, said interrupt controller, and said keyboard controller.

3. A computer system according to claim 2 further comprising:
   (a) a parallel communications controller in circuit communication with said CPU and configured to interface between said CPU and a parallel communications bus;
   (b) a fixed diskette drive;
   (c) fixed diskette drive controller in circuit communication with said CPU and configured to interface between said CPU and said fixed diskette drive;
   (d) a flexible diskette drive; and
   (e) flexible diskette drive controller in circuit communication with said CPU and configured to interface between said CPU and said flexible diskette drive; and
   wherein said basic input and output module stored within said PROM is configured to interface between code executing on said CPU and said memory controller, said video controller, said serial communications controller, said parallel communications controller, said interrupt controller, said keyboard controller, said flexible diskette controller, and said fixed diskette controller.

4. A computer system according to claim 1 wherein said communications controller is a serial communications controller, said communications link is a serial communications link, and said monitor and debugger module is in circuit communication with said external communications device via said serial communications link along an electrically conductive tether.

5. A computer system according to claim 1 further comprising a power-on self-test module stored in said PROM, configured to detect the presence of a predetermined number of said controllers, and further configured to initialize a predetermined number of said controllers, and wherein said monitor and debugger module begins execution after said power-on self-test module begins execution but before said power-on self-test module completes execution.

6. A computer system according to claim 1 further comprising:
  a power-on self-test module stored in said PROM, configured to detect the presence of a first predetermined number of said controllers, and further configured to initialize a second predetermined number of said controllers; and
  a nonvolatile memory in circuit communication with said CPU having at least one location capable of being written to and read by said CPU, said location having at least a first state and a second state; and
  wherein said monitor and debugger module responds to said nonvolatile memory location being in said first state by beginning execution after said power-on self-test module begins execution but before said power-on self-test module completes execution; and
  wherein said power-on self-test module responds to said nonvolatile memory location being in said first state by executing without causing the execution of said monitor and debugger module.

7. A method of communicating between a computer system and a communications device external to the computer system, the computer system having (i) a central processing unit (CPU) having registers associated therewith and capable of executing code including an operating system, (ii) a programmable read-only memory (PROM) in circuit communication with the CPU and containing code (PROM code) executable on the CPU, (iii) a random access memory (RAM) in circuit communication with the CPU, (iv) a memory controller in circuit communication with the CPU and configured to interface between the CPU and the RAM, (v) a video controller in circuit communication with the CPU and configured to generate signals corresponding to a visual image corresponding to data within a video memory, (vi) a communications controller in circuit communication with the CPU and configured to interface between the CPU and a communications bus, and (vii) a keyboard controller in circuit communication with the CPU and configured to interface between the CPU and a keyboard, comprising the steps of:
  initializing the communications controller to provide a communications link between the external communications device and the computer system;
  starting execution of a PROM code monitor and debugger module;
  transmitting a first monitor command to the monitor and debugger module from the external communications device via the communications link;
  responding to the first monitor command by transmitting to the external communications device from the monitor and debugger module via the communications link a signal corresponding to the then current state of the registers of the CPU;
  transmitting a second monitor command to the monitor and debugger module from the external communications device via the communications link;
  responding to the second monitor command by modifying the current state of the registers of the CPU;
  transmitting a third monitor command to the monitor and debugger module from the external communications device via the communications link;
  responding to the third monitor command by transmitting to the external communications device from the monitor and debugger module via the communications link a signal corresponding to the then current state of at least one memory location;
  transmitting a fourth monitor command to the monitor and debugger module from the external communications device via the communications link;
  responding to the fourth monitor command by modifying the state of at least one memory location;
  transmitting a first debugger command to the monitor and debugger module from the external communications device via the communications link;
  responding to the first debugger command by setting at least one breakpoint corresponding to at least one particular location in the RAM;
  transmitting a second debugger command to the monitor and debugger module from the external communications device via the communications link;
  responding to the second debugger command by clearing at least one breakpoint corresponding to at least one particular location in the RAM;
  transmitting a third debugger command to the monitor and debugger module from the external communications device via the communications link;
  responding to the third debugger command by starting the execution of PROM code by the CPU at a particular code instruction;
  responding to the executing PROM code accessing a portion of the RAM corresponding to a breakpoint by ceasing the execution of PROM code by the CPU;
  responding to the executing PROM code executing from a portion of the RAM corresponding to a breakpoint by ceasing the execution of code by the CPU,
  transmitting a fourth debugger command to the monitor and debugger module from the external communications device via the communications link; and
  responding to the fourth debugger command by causing the CPU to execute a single code instruction and transmitting to the external communications device via the communications link a signal corresponding to the then current state of the registers of the CPU.

8. A method of communicating between a computer system and a communications device external to the computer system as described in claim 7 further comprising the step of loading an operating system into memory and wherein the monitor and debugger routine is characterized by being capable of execution without an operating system being present in memory, and said step of starting execution of a monitor and debugger module is performed before said step of loading the operating system into the RAM.

9. A method of communicating between a computer system and a communications device external to the computer system as described in claim 7 wherein said computer system further comprises a power-on self-test module configured to detect the presence of a first predetermined number of said controllers, and further configured to initialize a second predetermined number of said controllers, and said step of starting execution of a monitor and debugger module is performed after said power-on self-test module begins execution but before said power-on self-test module completes execution.

10. A method of communicating between a computer system and a communications device external to the computer system as described in claim 7 wherein said step of starting execution of a monitor and debugger module comprises the steps of:

(a) testing the status of at least one line of said communications link to determine if the external communications device is connected to the computer system and ready to transceive data; and (b) responsive to the status of the at least one line of said communications link indicating that the external communications device is connected to the computer system and ready to transceive data, causing the execution of the monitor and debugger routine.

* * * * *